(12) United States Patent
Hankemeier et al.

(10) Patent No.: US 12,072,322 B2
(45) Date of Patent: Aug. 27, 2024

(54) METHOD FOR MATRIX EFFECT CORRECTION IN QUANTITATIVE MASS SPECTROMETRIC ANALYSIS OF ANALYTES IN COMPLEX MATRICES

(71) Applicant: UNIVERSITEIT LEIDEN, Leiden (NL)

(72) Inventors: Thomas Hankemeier, Leiden (NL); Anne Charlotte Dubbelman, Leiden (NL); Amy C. Harms, Leiden (NL); Oskar González, Leiden (NL)

(73) Assignee: UNIVERSITEIT LEIDEN, Leiden (NL)

( * ) Notice: Subject to any disclaimer, the term of this patent is extended or adjusted under 35 U.S.C. 154(b) by 530 days.

(21) Appl. No.: 17/293,978

(22) PCT Filed: Nov. 18, 2019

(86) PCT No.: PCT/NL2019/050752
§ 371 (c)(1),
(2) Date: May 14, 2021

(87) PCT Pub. No.: WO2020/101499
PCT Pub. Date: May 22, 2020

(65) Prior Publication Data
US 2022/0003726 A1 Jan. 6, 2022

(30) Foreign Application Priority Data
Nov. 16, 2018 (NL) ...................................... 2022019

(51) Int. Cl.
*G01N 30/72* (2006.01)
*G01N 30/04* (2006.01)
(Continued)

(52) U.S. Cl.
CPC ......... *G01N 30/7266* (2013.01); *G01N 30/04* (2013.01); *G01N 30/8631* (2013.01);
(Continued)

(58) Field of Classification Search
CPC ............... G01N 30/7266; G01N 30/04; G01N 30/8631; G01N 30/8658; G01N 2030/025; G01N 2030/045
See application file for complete search history.

(56) References Cited

U.S. PATENT DOCUMENTS

| | | | |
|---|---|---|---|
| 2008/0128606 A1 | 6/2008 | Grant et al. |
| 2013/0068943 A1 | 3/2013 | Heaven |
| 2016/0203963 A1 | 7/2016 | Green |

FOREIGN PATENT DOCUMENTS

| | | |
|---|---|---|
| CN | 102484030 A | 5/2012 |
| CN | 107427742 A | 12/2017 |

(Continued)

OTHER PUBLICATIONS

Xie Jiashu et al., "The Matrix Effect of Biological Samples in Measurement", Journal of Pharmaceutical Analysis, vol. 28, No. 8, pp. 1386-1389, Dec. 31, 2008.
(Continued)

*Primary Examiner* — Daniel S Larkin
(74) *Attorney, Agent, or Firm* — Harness, Dickey & Pierce, P.L.C.

(57) ABSTRACT

The present invention relates to a method for quantifying one or more analytes in a sample by an analysis system comprising a separation unit (LC column), a means of adding a solution post-column (Connector), and a detection unit comprising a mass spectrometer coupled through an ionization source, the method comprising: • (i) inducing matrix effect on the analytes in the sample and on the post-column infused internal standards (PCI-ISs); • (ii)
(Continued)

matching one or more post-column infused internal standard (PCI-IS) to each analyte that best matches the analyte's response to the matrix effect, and • (iii) storing the analyte-matched PCI-IS identification and, optionally, associated response data in a library; and • (iv) applying the analyte-matched PCI-IS to the analyte in other samples to correct the analyte peak responses for the matrix effect during ionization and to obtain (absolute) quantitation of the analyte using the response data.

20 Claims, 7 Drawing Sheets

(51) Int. Cl.
    *G01N 30/86*    (2006.01)
    *G01N 30/02*    (2006.01)

(52) U.S. Cl.
    CPC ... *G01N 30/8658* (2013.01); *G01N 2030/025* (2013.01); *G01N 2030/045* (2013.01)

(56) References Cited

FOREIGN PATENT DOCUMENTS

| | | |
|---|---|---|
| CN | 107621501 A | 1/2018 |
| CN | 108676843 A | 10/2018 |
| TW | 201231136 A | 8/2012 |
| WO | WO-2010/149595 A1 | 12/2010 |
| WO | WO-2016/071695 A1 | 5/2016 |

OTHER PUBLICATIONS

Julia Rossman et al., "Evaluation of the matrix effect of different sample", Journal of Chromatography B, vol. 1000, pp. 84-94, Jul. 17, 2015.
Office Action from corresponding Chinese Application No. 2019800833177, Dated Aug. 16, 2023.
International Search Report from corresponding PCT Application No. PCT/NL2019/050752, dated Feb. 20, 2020.
Helen Stahnke et al: "Compensation of Matrix Effects by Postcolumn Infusion of a Monitor Substance in Multiresidue Analysis with LC-MS/MS", Analytical Chemistry, vol. 81, No. 6, Mar. 15, 2009.
Kruve A et al: "Combating matrix effects in LC/ESI/MS: The extrapolative dilution approach", Analytica Chimica Acta, Elsevier, Amsterdam, NL, vol. 651, No. 1, Sep. 28, 2009.
J. Throck Watson et al: "Adduct Formation" in: "Introduction to mass spectrometry: instrumentation, applications, and strategies for data interpretation", Mar. 1, 2008.
Oskar Gonzalez et al: "Matri x Effect Compensation in Small-Molecule Profiling for an LC-TOF Platform Using Multicomponent Postcolumn Infusion", Analytical Chemistry, vol. 87, No. 12, Jun. 16, 2015.
International Preliminary Repot on Patentability (IPRP) from corresponding PCT Application No. PCT/NL2019/050752, dated May 18, 2021.
Wu Shengming et al., "Applicability Researches on Analysis Method of Chemical Product Testing Projects", Proceedings of 2012 Annual Conference on Chinese Society for Environmental Sciences (the fourth volume), pp. 3376-3381, published 2012.
Office Action from corresponding Chinese Application No. 2019800833177, Dated Jun. 1, 2024.

A

B

A

B

C

METHOD FOR MATRIX EFFECT CORRECTION IN QUANTITATIVE MASS SPECTROMETRIC ANALYSIS OF ANALYTES IN COMPLEX MATRICES

CROSS-REFERENCE TO RELATED APPLICATIONS

This application is a national phase application of PCT Application No. PCT/NL2019/050572, filed on 18 Nov. 2019, which claims priority to Netherland Patent Application No. 2022019, filed on 16 Nov. 2018. The entire disclosure of the applications identified in this paragraph is incorporated herein by references.

FIELD OF THE INVENTION

The present invention relates to the field of analytical chemistry and quantitative mass spectrometry (MS) and, more particularly, to methods for correcting measured data for variation in ionization efficiency caused by the sample matrix, in order to obtain data that inform about the relative or absolute quantity of compounds in a sample, irrespective of the sample matrix.

BACKGROUND OF THE INVENTION

Liquid chromatography-mass spectrometry (LC-MS) is currently the most widespread analytical technique for analysing organic compounds in different fields, such as environmental analysis, food analysis, bioanalysis, or metabolomics. Because of its high selectivity, sensitivity and throughput, this technology is also increasingly being used in the clinical laboratory. The high selectivity afforded by mass spectrometry detectors allowed the development of analytical methods with minimal sample treatment and high-throughput analysis, since complete LC separation is often not required as the only discriminating factor.

Nevertheless, it was found that coeluting compounds may affect the ionization of an analyte, and therefore alter, or suppress its quantification, even if they are not identified as interferences affecting the selectivity of the method. The effect in the ionization, which can be either positive, i.e. ion enhancement, or negative, i.e. ion suppression, is known as matrix effect, and is currently one of the main issues in LC-MS, especially from a quantitative point of view. Although many theories have been proposed to explain matrix effects, the exact mechanisms remain yet unexplained and complex. However, for electrospray ionization it is well-known that the ionization efficiency of an analyte is highly dependent on its physicochemical properties, as set out in Annesley T M, Ion Suppression in Mass Spectrometry, Clin Chem. 2003;47(7):1041-4, and King R, Bonfiglio R, Fernandez-Metzler C, Miller-Stein C, Olah T. Mechanistic investigation of ionization suppression in electrospray ionization. J Am Soc Mass Spectrom. 2000;11(11):942-50.

On the one hand molecules with high ionization potential are more easily ionized, and on the other hand, molecules with high surface affinity have more access to the excess of charge in the surface of the droplet.

In the same way, coeluting compounds can affect the ionization process to a different extent either in the liquid phase by influencing droplet formation, impeding solvent desolvation, or competing for the excess of charge or in the gas phase via proton exchange. In any case, the ion suppression or enhancement process takes place in the ionization source, and consequently, both the type of ionization source employed and its design affect matrix effect.

Matrix effects are thus the alterations of ionization efficiency by the presence of co-eluting substances. A problem of matrix effects in LC-MS is that it is unseen in the chromatogram as such, but has deleterious impact on the accuracy and sensitivity of an analysis method. The matrix effect becomes usually particularly problematic when comparing quantitative results between analytes in different sample sources. The high variability in kind and number of compounds in different sources usually is accompanied by a high relative matrix effect typically leading to unreliable results.

Another problem of matrix effect is the fact that it depends on the analyte concentration and the matrix in a nonlinear manner, resulting in systematic errors (biases) that are propagated down in an uncontrolled, unpredictable, and nonlinear manner, making it impossible for algorithms to report meaningful statistics as measures of data processing quality and reliability. In other words, the results of the peak processing are not robust and can be unreliable with regards to quantitative results depending on the particular experiment or sample composition.

This problem occurs when using the same instrument, but problematic is also the instrument-to-instrument variation, in particular for biomarker discovery and profiling, where mass spectral data of large numbers of analytes are quantitatively compared to each other from a diverse group of samples for differential analysis.

The current gold standard to correct for differences in response due to ion suppression caused by co-eluting compounds is to use stable isotope analogues as internal standards. Such stable isotope-labelled internal standards (referred to herein as STIL-ISs) exhibit identical physicochemical properties as their non-labelled analogues and can be spiked to the samples before analysis. Quantification is then carried out by determining the response ratio of the analyte of interest and its STIL-IS.

In untargeted LC-MS analysis, however, the use of STIL-ISs is not possible, because the analytes of interest are often unknown. Even in targeted LC-MS analysis it is often not possible, not practical or too expensive to use a STIL-IS for each analyte of interest.

Additionally, if an analysis is carried out using one STIL-IS for several related compounds, as is often done, the internal standard correction will only work if the matrix effect is constant along the chromatographic run. However, this is not often the case, and consequently, the matrix effect can be extremely different for the STIL-IS and other analytes of interest due to the high retention time dependence of the matrix effect. In some cases, this retention time dependence even renders STIL-ISs unable to correct for the matrix effect of an analyte, e.g. as sometimes in the case of deuterium-based STIL-ISs due to slight changes in retention time caused by the deuterium isotope effect.

Accordingly, it would be desirable and highly advantageous to have a method for correcting the matrix effect for complex samples in quantitative LC-MS analyses, to overcome the above-described deficiencies and disadvantages of the prior art. It would also be particularly useful to be able to quantitatively compare concentrations of compounds between matrices, without availability of either reference standards or stable labelled isotopes or similar internal standards for each compound, as these are not always available. Even more useful would be that these concentrations could be converted into an absolute concentration, making it possible to compare concentration data between instruments and with databases. It would further be helpful to do so for metabolites that have not been identified yet at the moment of measurement, but are identified later, and then to quantify them after identification in samples measured prior to their identification.

An approach to improve quantitation involves the addition of a standard infused post column to correct for matrix effect. The use of standards or modifiers added post column have been described before for several applications, for example to derivatize compounds, to direct fragmentation, or to enhance ionization. WO2016071695 discloses a dynamic post-column addition, wherein post-separation reagents are added to the eluent that can affect the e.g. ionization efficiency/stability/adduct formation of analytes of interest in a time scheduled way.

Previous methods have used a post-column addition of standards to correct known compounds for matrix effect. For example, in WO-A-2010149595 a continuous postcolumn infusion of the known target compound, at a known concentration together with the injected sample is applied, permitting to compensate or correct the measured output. Stahnke et al, Anal Chem, 2009, 81, 2185-2192 compensate for matrix effects by postcolumn infusion of a monitor substance in multiresidue analysis with LC-MS/MS using 1 PCI-IS to correct for a complete set of known and available analytes.

Matrix effect has been corrected in other ways such as that described by Kruve et al, Analytica Chemica Acta 651 (2009) 75-80 which discloses a method for combating matrix effects in LC/ESI/MS: the extrapolative dilution approach without using a post-column addition.

While the approaches disclosed herein above have allowed some progress in improving quantitation, none address the issues that come with untargeted analysis, and none of these methods have an efficient way to choose the proper PC-IS if there is no ion suppression in the sample injected, but maybe in another sample.

To store analytical characteristics related to proper correction, it is necessary to build a library of features being studied. Libraries and collections of information about analytes are commonly created to improve data quality. US-A-20160203963 discloses a method for mass correction, to build a library with one (or more) physicochemical characteristics of matrix components eluting over a chromatographic run. Then the measured error of the matrix components in a sample over chromatographic time is used to correct the error of the same physicochemical characteristic of an analyte of interest eluting between the known matrix compounds. This and other libraries have been made to collect chemical properties of analytes but so far they stop short of offering solutions for unknown analyte interactions caused by matrix components that affect quantitation.

An object of the present invention is to provide an alternative method for correcting the sample matrix effects in analytical techniques as well as systems operating in accordance with the method.

SUMMARY OF THE INVENTION

According to a first aspect of the invention, a method is disclosed for quantifying one or more analytes in a sample by an analysis system comprising a separation unit, a means of adding a solution post-column, and a detection unit comprising a mass spectrometer coupled through an ionization source, the method comprising:

I. inducing matrix effect on the analytes in the sample and on the post-column infused internal standards (PCI-ISs) by one or more of the following steps:
   i. adding one or more test matrices (matrices B) to the eluate, after the separation and before introduction to the ionization source of the mass spectrometer (herein referred to as post-column);
   ii. varying the composition of the sample matrix (matrix A) by mixing it with other test matrices (matrices C);
   iii. varying the concentration of the sample matrix (matrix A); and
II. matching one or more post-column infused internal standard(s) (PCI-IS) to each analyte that best matches the analyte's response to the matrix effect, and
III. storing the analyte-matched PCI-IS identification and, optionally, associated response data in a library; and
IV. applying the analyte-matched PCI-IS to the analyte in other samples to correct the analyte peak responses for the matrix effect during ionization and, optionally, to obtain (absolute) quantitation of the analyte using the response data.

According to a second aspect of the present invention, the analyte-matched PCI-IS can be applied to the analyte in other samples in order to correct the analyte peak responses for matrix effect during ionization, leading to more accurate and, over time, more precise quantitation. Hence, in a second aspect, the present invention relates to a system for determination of the structure and/or quantity of one or more analytes in a sample, the system comprising:

V. an analysis system comprising a sample separation unit, a means of or device for adding a solution post column, and a detection unit comprising a mass spectrometer coupled through an ionization source;
VI. an, optionally used, unit for inducing a matrix effect on the analytes in the sample;
VII. a unit for matching one or more post-column infused internal standard(s) (PCI-IS) to each analyte that best matches the analyte's response to the matrix effect, and
VIII. a library unit for storing the analyte-matched PCI-IS identification and, optionally, associated response data in a library, and
IX. a processing unit for applying the analyte-matched PCI-IS to the analyte in another sample to correct the analyte peak responses for the matrix effect during ionization, and optionally, to obtain concentration data of the analytes.

In a third aspect, the present invention relates to a test matrix composition for determination of the structure and/or quantity of one or more analytes in a sample, wherein the composition comprises one or more salts and/or ionic compounds able to form adducts, a compound with surface activity and/or a compound with high proton affinity, and/or a biologically originating matrix, a fraction thereof, or other compound(s) expected to induce a matrix effect on the analytes in the sample, in a predetermined concentration and a suitable solvent or eluent.

In a fourth aspect, the present invention relates to a kit for use in a system for determining and correcting sample matrix effects on the detection of an analyte in a sample, comprising one or more matrix compositions comprising one or more salts and/or ionic compounds able to form adducts, a compound with surface activity and/or a compound with high proton affinity, and/or a biologically originating matrix, a fraction thereof, or other compound(s)

expected to induce a matrix effect on the analytes in the sample, in a predetermined concentration and a suitable solvent or eluent.

In a fifth aspect of the present invention, a method is disclosed for quantifying one or more analytes, wherein the analyte can be a feature for which no structure has been assigned yet or a compound with a known structure for which no reference material is available, or a compound for which the use of reference material is not practical due to costs or instability, in a sample by an analysis system comprising a separation unit, a means of adding a solution post-column, and a detection unit comprising a mass spectrometer coupled through an ionization source, the method comprising:

X. inducing matrix effect on the analytes in the sample and on the post-column infused internal standards (PCI-ISs); and XI. matching one or more post-column infused internal standard(s) (PCI-IS) to each analyte that best matches the analyte's response to the matrix effect, and XII. storing the analyte-matched PCI-IS identification and, optionally, associated response data in a library; and XIII. applying the analyte-matched PCI-IS to the analyte in other samples to correct the analyte peak responses for the matrix effect during ionization and, optionally, to obtain (absolute) quantitation of the analyte using the response data.

These and other aspects, features and advantages of the present invention will become apparent from the following detailed description of preferred embodiments, and the independent and dependent claims which is to be read in connection with the accompanying drawings.

BRIEF DESCRIPTION OF THE DRAWINGS

Embodiments of the invention are further described hereinafter with reference to the accompanying drawings, wherein like letters and numerals refer to like parts and wherein the figures in this section illustrate a preferred instrumental setup, the selection of the PCI-IS pursuant to the invention to correct for an analyte's response and the actual correction procedure.

FIG. 3 schematically represents the reconstruction of the analyte signal with the PCI-IS signal. The signal of the analyte (solid line, FIG. 3A) is scan-by-scan divided by the signal of the PCI-IS (dotted line in FIG. 3A) to obtain the reconstructed analyte signal (FIG. 3B). In this figure the PCI-IS 2 refers to the PCI-IS that was selected to best match the analyte's response to induced matrix effect in FIG. 2, therefore the y-axis is defined as the corrected intensity.

FIG. 7A) shows without any correction, FIG. 7B) with internal standard correction only and FIG. 7C) with PCI-IS and internal standard correction. The grey shade is the area within 15% of the optimal value of 100%.

DETAILED DESCRIPTION OF THE INVENTION

Figure 1:
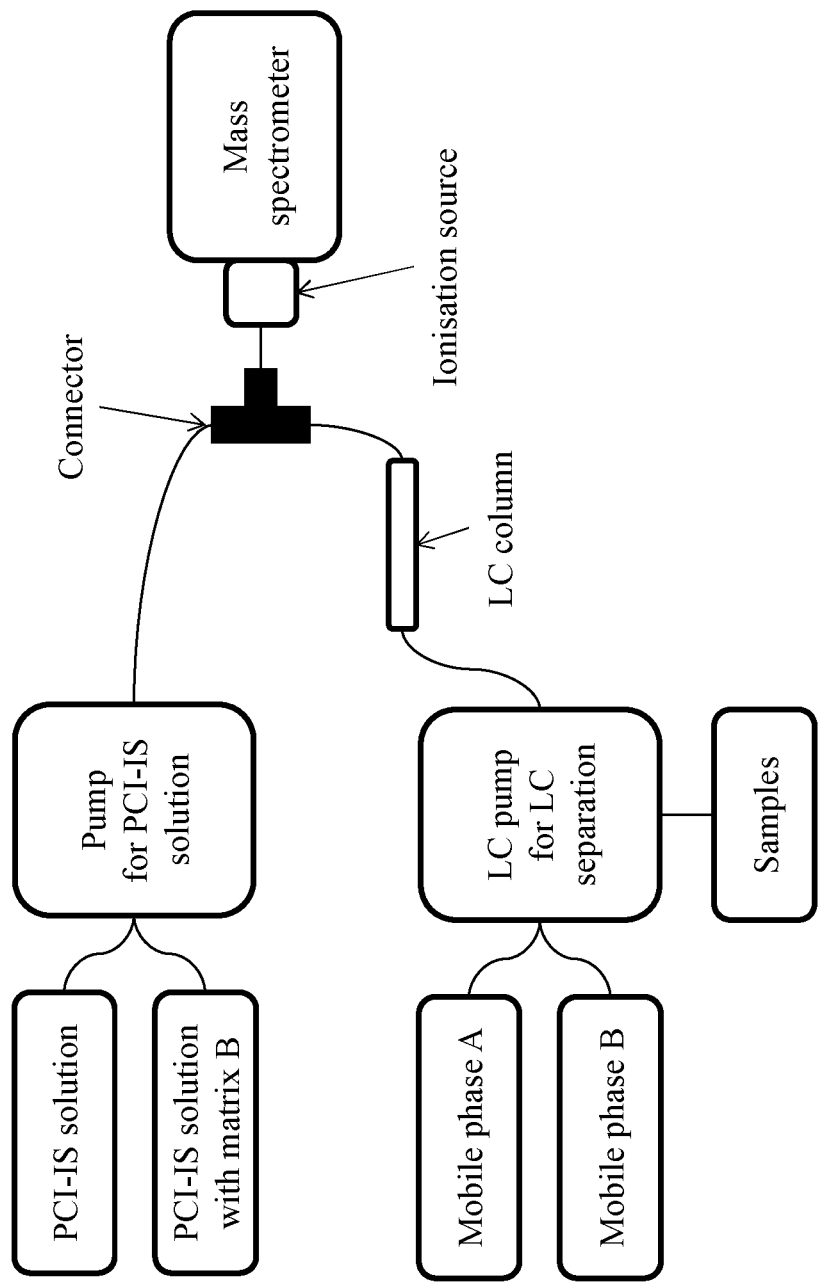
FIG. 1: Schematic overview of a possible instrumental setup of the described matrix effect correction method for quantitative targeted and non-targeted mass spectrometric analysis of compounds in complex matrices.
Figure 2:
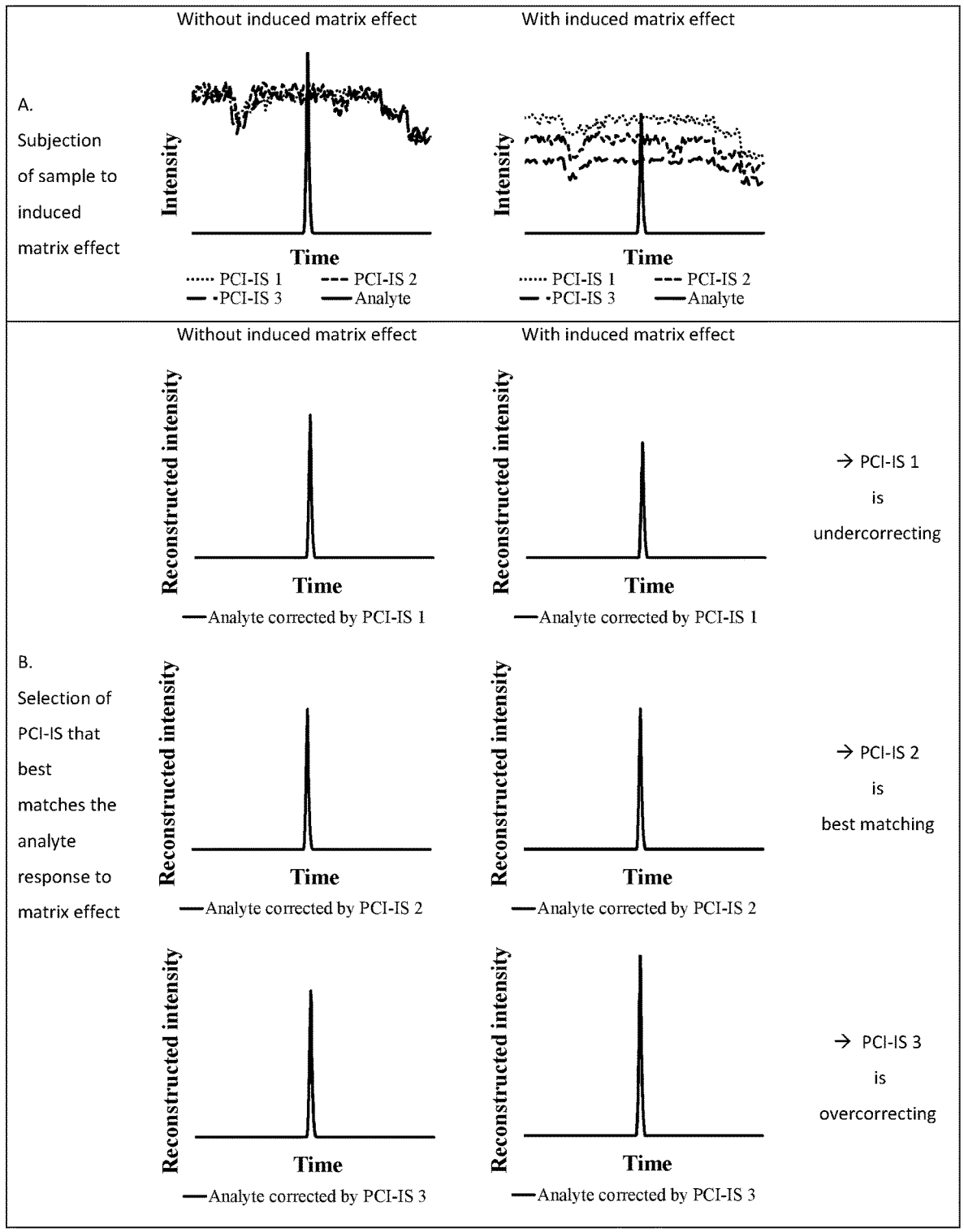
FIG. 2 schematically represents LC-MS results when subjecting an analyte in a sample to induced matrix effect and finding the PCI-IS that best matches the analyte's response to matrix effect, to select it for PCI-IS correction of the analyte in other samples.

Unless otherwise stated, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

The present invention will be described with respect to particular embodiments and with reference to certain drawings but the invention is not limited thereto but only by the claims. Any reference signs in the claims shall not be construed as limiting the scope. The drawings described are only schematic and are non-limiting. In the drawings, the size of some of the elements may be exaggerated and not drawn on scale for illustrative purposes. Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The following terms or definitions are provided solely to aid in the understanding of the invention. These definitions should not be construed to have a scope less than understood by a person of ordinary skill in the art.

The term "analyte", as used herein, refers to the substance to be detected and/or quantified in the methods of the present invention.

The term "sample" as used herein as such relates to a composition comprising a matrix, i.e. the sample matrix, and therein the analyte of interest.

The term "sample matrix effects" as used herein, refers to the effect of the sample matrix on the ionization of the analyte in the sample.

The term "sample matrix" is understood to mean the compounds present in the sample which are not the analyte.

The term "matrix" is understood to mean a composition comprising one or more compounds but essentially free of the analyte of interest. These components may comprise endogenous components such as phospholipids, carbohydrates, and endogenous metabolites; residual formulation components from intraperitoneal, intravenous, or oral dosing experiments; for example, polyethylene glycol, polysorbate; co-eluting drug metabolites; concomitant medications and or mobile phase additives or solvents employed which potentially exhibit an interaction with the analyte of interest; or contaminants from sample handling or processing.

The term "test matrix" refers to matrices other than the sample matrix.

In matrices for use in the subject invention, the components may be advantageously chosen such that they are known, and at determined concentrations. Suitable matrices according to the invention comprise a solvent or combination of solvents that essentially do not induce a matrix effect on the analytes, and/or one or more salts and/or ionic compounds able to form adducts, and/or one or more compounds with surface activity, and/or one or more compounds with high proton affinity, and/or one or more biologically originating matrices or fractions thereof, and/or other compound(s) expected to induce a matrix effect on the analytes in the sample.

In the context of the present specification, test matrices are herein referred to as matrix or matrices B when added to the eluate after the separation and before introduction to the ionization source of the mass spectrometer, i.e. for addition as post-column matrix. Where a sample matrix, also referred to as matrix A is replaced with or added to one or more other matrices, wherein the analyte, their stable isotope and/or other non-endogenous analogue are spiked into such matrixes, these are referred to as test matrices C, or matrices C.

The term "correcting for sample matrix effects" is understood as adjusting the response of the analyte in a sample to compensate for the sample matrix effect during ionization.

The term "post-column infused internal standard (PCI-IS)" is understood as an internal standard that is added to the eluate after the separation and before introduction to the ionization source of the mass spectrometer; wherein a suitable addition unit is referred to as a "means to add post-column" of standards or test matrices.

The present invention provides methods, tools and a system for correcting sample matrix effects according to the methods of the present invention. The invention is based on the observation that components of the sample matrix can influence the detection and in particular quantification of an analyte. The analytes may be known, or unknown, or known but without a suitable standard available that could be used to determine the concentration using a calibration experiment.

This influence of the sample matrix can be determined by comparing the effect of different test matrices, and by correlating those under identical conditions, and finally, correcting the measured values by using the most likely applicable correction values, thereby ensuring a more accurate and reliable detection and/or quantification of an analyte in a sample.

The origin of the sample matrix effects determined by the methods of the present invention is variable and will depend on the nature of the sample.

Samples in which detection of an analyte is envisaged according to the present invention include samples from biological material as well as compositions derived or extracted from such biological material. The sample may be any preparation comprising an analyte to be detected. The sample may comprise, for instance, all or several components of body tissue or fluid such as but not limited to blood, including plasma and platelet fractions, spinal fluid, mucus, sputum, saliva, semen, stool or urine or any fraction thereof.

Exemplary samples may comprise material derived from whole blood, red blood cells, white blood cells, hair, nails and cuticle material, swabs, including but not limited to buccal swabs, throat swabs, vaginal swabs, urethral swabs, cervical swabs, throat swabs, rectal swabs, lesion swabs, abscess swabs, nasopharyngeal swabs, and the like, lymphatic fluid, amniotic fluid, cerebrospinal fluid, peritoneal effusions, pleural effusions, fluid from cysts, synovial fluid, vitreous humor, aqueous humor, bursa fluid, eye washes, eye aspirates, plasma, serum, pulmonary lavage, lung aspirates, biopsy material of any tissue in the body, as well as lysates, extracts, or material obtained from any of the above exemplary biological samples.

Tissue culture cells, including explanted material, primary cells, secondary cell lines, and the like, as well as lysates, extracts, supernatants or materials obtained from any cells, tissues or organs, are also within the meaning of the term biological sample as used herein. Samples comprising microorganisms and viruses are also envisaged in the context of analyte detection using the methods of the invention. Materials obtained from forensic settings are also within the intended meaning of the term "sample".

Samples may also comprise foodstuffs and beverages, cosmetics, environmental samples such as water, soil, sand, air sample, and the like, wherein it is noted that any of the above lists are not intended to be exhaustive.

The methods of the present invention are methods which involve the detection of an analyte. The nature of the analyte to be detected is not critical to the invention and can be any molecule or aggregate of molecules of interest for detection. A non-exhaustive list of analytes includes a protein, polypeptide, peptide, amino acid, nucleic acid, oligonucleotide, nucleotide, nucleoside, carbohydrate, polysaccharide, lipopolysaccharide, glycoprotein, lipoprotein, nucleoproteins, lipid, hormone, steroid, growth factor, cytokine, neurotransmitter, receptor, enzyme, antigen, allergen, antibody, metabolite, cofactor, nutrient, toxin, poison, drug, biowarfare agent, biohazardous agent, infectious agent, prion, vitamin, immunoglobulins, albumin, hemoglobin, coagulation factor, interleukin, interferon, cytokine, a peptide comprising a tumor-specific epitope and an antibody to any of the above substances. An analyte may comprise one or more complex aggregates such as but not limited to virus, bacteria, microorganism such as *Salmonella, Streptococcus, Legionella, E. coli, Giardia, Cryptosporidium, Rickettsia*, spore, mold, yeast, algae, amoebae, dinoflagellate, unicellular organism, pathogen or cell, and cell-surface molecules, fragments, portions, components, products, small organic molecules, nucleic acids and oligonucleotides, metabolites of microorganisms.

Typical compounds and conditions commonly present in samples or semi-purified fractions of samples can cause sample matrix effects. It is however not critical to the present invention that the causative factor of the sample matrix effects are identified.

The subject process may advantageously be performed in several different ways to induce matrix effect on analytes in a sample. Herein, mainly three methods are being distinguished, which can be used either alone or in a combined form:

A. adding one or more test matrices (matrices B) to the eluate, after the separation and before introduction to the ionization source of the mass spectrometer (herein referred to as post-column);

B. varying the composition of the sample matrix (matrix A) by mixing it with other test matrices (matrices C);

C. varying the concentration of the sample matrix (matrix A)

In either case, i.e. whether the analysis is performed with or without induced matrix effect, one or more PCI-ISs are infused. Also, apart from using one or more PCI-IS, it may be advantageous to also add one or more internal standard(s) to the sample during the sample preparation. Preferably, these may be used to correct for variability in sample preparation and/or sample injection volume. Preferably, also these should be corrected by a PCI-IS.

FIG. 1 schematically visualizes a preferred instrumental setup of the method for matrix effect correction in quantitative mass spectrometric analysis of analytes in complex matrices. Preferably, a separation unit is present comprising e.g. a liquid chromatography unit. Preferably, the ionization source is an electrospray ionization source.

A preferred method according to the invention comprises a method wherein the induction of a matrix effect in claim 1 step (a), comprises one or more of the following steps:

D. adding one or more test matrices (matrices B) to the eluate, after the separation and before introduction to the ionization source of the mass spectrometer (herein referred to as post-column);

E. varying the composition of the sample matrix (matrix A) by mixing it with other test matrices (matrices C);

F. varying the concentration of the sample matrix (matrix A)

Preferably in step (D) the one or more matrices comprise at least one compound, or a plurality of compounds expected to induce a matrix effect on the analytes in the sample. Advantageously, the test matrix or matrices are chosen from one or more salts and/or ionic compounds able to form adducts and/or a compound with surface activity and/or a compound with high proton affinity, and/or a biologically originating matrix, a fraction thereof, or other compound(s) expected to induce a matrix effect on the analytes in the sample.

Preferably in (E) the test matrix (matrix C) comprises a solvent or combination of solvents that essentially do not induce a matrix effect on the analytes, or a biologically originating matrix, a fraction thereof and/or a single or plurality (of) compound(s) expected to induce a matrix effect on the analytes in the sample.

More preferably, the present invention also relates to a method for determining for each analyte the PCI-IS that best matches the analyte's response to matrix effect, comprising:

G. determining for each analyte in the sample a signal, for example peak area, reconstructed by each PCI-IS, and preferably an internal standard added prior to or during sample preparation, optionally, with and without inducing matrix effect as set out herein above; and H. assessing, based on (G), which of the PCI-IS compounds matches best the analyte's response to the induced matrix effect.

Advantageously, the method for determining for each analyte each PCI-IS and internal standard reconstructed signal, both with and without inducing matrix effect, comprises one or more steps of:

I. Optionally, adding one or more internal standards to the sample prior to analysis;

J. subjecting the analytes of the sample to the analysis system, while adding post-column (a solution of) one or more PCI-IS(s) to the eluate;

K. repeating the subjection of the analytes of the sample to the analysis system while inducing matrix effect by applying one or more of the procedures specified herein-above;

L. dividing in each sample the signal (or intensity) of the analyte scan-by-scan by the PCI-IS signal (or intensity) in the same analysis run, giving a PCI-IS-reconstructed analyte signal (or peak response);

M. optionally, dividing the signal (or intensity) of the internal standard (added to the sample prior to analysis) scan-by-scan by the signal (or intensity) of its matched PCI-IS in the same measurement run, giving the PCI-IS-corrected internal standard signal (or peak response);

N. optionally, dividing the PCI-IS-reconstructed analyte signal (or peak response) by the applicable PCI-IS-corrected internal standard signal(s) (or peak response(s)) in the same measurement run, giving the PCI-IS and internal standard reconstructed peak response.

Preferably the internal standards added to the sample during sample preparation comprise a structural analogue of a PCI-IS and/or a stable isotope labelled version of a PCI-IS.

Preferably, a smoothing or averaging algorithm on the signal is applied in steps (L) and/or (M) and/or (N).

Preferably the assessment for each analyte which PCI-IS matches best the analyte's response to the induced matrix effect comprises basing the selection of PCI-IS on values for accuracy, preferably by comparing the analyte response in a sample with matrix B or C versus the measured values obtained without matrix B or C.

Preferably the assessment for each analyte which PCI-IS matches best the analyte's response to the induced matrix effect comprises basing the selection of PCI-IS on values for precision of PCI-IS (and optionally internal standard) reconstructed peak response of the analyte across matrices and/or samples.

Advantageously, the selection of PCI-IS is based on its ability to increase the linear dynamic range of an analyte and/or on values for accuracy or precision.

Preferably, the PCI-IS matches best the analyte's response to the induced matrix effect is stored in the library unit, for later use.

Preferably, the analyte-matched PCI-IS in the library is applied to the analyte in other samples, comprising the steps of:

O. Optionally adding none, one or more internal standards to the sample prior to analysis;

P. subjecting the analytes of the sample to the analysis system;

Q. adding post-column (a solution of) one or more PCI-IS(s) to the eluate;

R. matching the analyte signals found in the sample with analytes stored in the library unit; and S. reconstructing the mass spectrometric response of each analyte in the sample for matrix effect as detailed in herein above under steps L to N, using the matched PCI-IS in the library unit and the optional internal standard, to obtain the (final) PCI-IS and internal standard corrected peak response.

Preferably, retrospective data processing is applied to correct analytes for matrix effect using a PCI-IS found to be suitable to correct for this analyte in a later experiment.

Preferably, prospective or retrospective data processing is applied to absolutely quantify measured analytes for which a reference standard is or has become available using a PCI-IS correction based on a PCI-IS found to be suitable for correcting the matrix effect and a calibration series of the analyte that has been measured with the PCI-IS at least once.

The present process preferably includes selecting a PCI-IS that best matches the analyte response to matrix effect. In order to select the PCI-IS that best matches the analyte response to matrix effect, a matrix effect is induced by either altering the matrix in the samples or adding a matrix (matrix B) post-column.

Preferably, a variety of test matrices is used to induce a matrix effect on the analytes in a sample, wherein the induced effect of the individual test matrices on the analyte is used employed for (a) at least partial structural identification classification or another kind of partial identification of the analyte; and/or (b) optimization of the selection of PCI-IS or a combination of PCI-ISs that best matches the analyte's response to induced matrix effects.

Samples containing the analytes are preferably separated using an LC method over an LC column, after which the flow is connected to a flow that contains the PCI-IS solution with or without matrix B. The PCI-IS solution flow can be provided by any suitable means, such as e.g. a LC pump or a syringe pump. The combined flow is then directed towards the ionisation source of the mass spectrometer (FIG. 1). In a preferred test matrix composition for determination of the structure and/or quantity of one or more analytes in a sample, the composition comprises one or more salts and/or ionic compounds able to form adducts, a compound with surface activity and/or a compound with high proton affinity, and/or a biologically originating matrix, a fraction thereof, or other compound(s) expected to induce a matrix effect on the analytes in the sample, are employed in a predetermined concentration and a suitable solvent or eluent.

The present invention also relates to a method wherein the PCI-IS signal or a signal ratio between analyte and PCI-IS is being used for quality control purposes.

The present invention also relates to a kit for use in a system for determining and correcting sample matrix effects on the detection of an analyte in a sample, comprising one or more matrix compositions comprising one or more salts and/or ionic compounds able to form adducts, a compound with surface activity and/or a compound with high proton affinity, and/or a biologically originating matrix, a fraction thereof, or other compound(s) expected to induce a matrix effect on the analytes in the sample, in a predetermined concentration and a suitable solvent or eluent.

Also, the present method can be used to induce matrix effect into unknown samples, containing not yet identified analytes, or analytes for which the structure is known but not a calibration model has been established with the PCI-IS yet, and to later use the measured data to quantify the absolute amounts once a calibration model has been measured with the PC-IS. The concentration of an identified compound can be estimated by using a calibration model with an analyte with a similar structure for which the ionization efficiency is expected, or predicted, to be similar. Actually, for this estimation the exact structure of the analyte has not to be known but the compound has to be characterized well enough to estimate the response factor.

Typical systems in which the present invention may be used will now be described with the following examples, demonstrating the value of the invention in both targeted and untargeted analysis.

Example 1

Selecting the best matching PCI-IS in a real situation.

Background: In LC-MS analysis of fatty acids, usually one internal standard is spiked to the sample and used to correct for multiple fatty acids, which can result in non-precise results if the matrix effect differs over retention time. Here we investigate the possibility of correcting an example fatty acid (oleic acid d17) for matrix effect, using the PCI-IS. The example focusses on the selection of the best matching PCI-IS from two tested PCI-ISs.

Methods and results: A solution of oleic acid-d17 in IPA was added to dried supernatants of protein precipitation for various volumes of plasma: 10, 20, 30, 40 and 50 uL. Pane A shows the extracted ion chromatogram (EIC) of oleic acid-d17. It shows that increasing the concentration of plasma (matrix A) has a suppressing effect on the response of oleic acid-d17. Two PCI-ISs were infused, FA(16:0)-d31 (with the EIC in pane B) and LPC(19:0) (with the EIC in pane C). Pane D shows the PCI-IS FA(16:0)-d31 reconstructed peak responses of oleic acid-d17 and pane E shows the LPC(19:0) reconstructed peak responses of oleic acid-d17.

Figure 4:
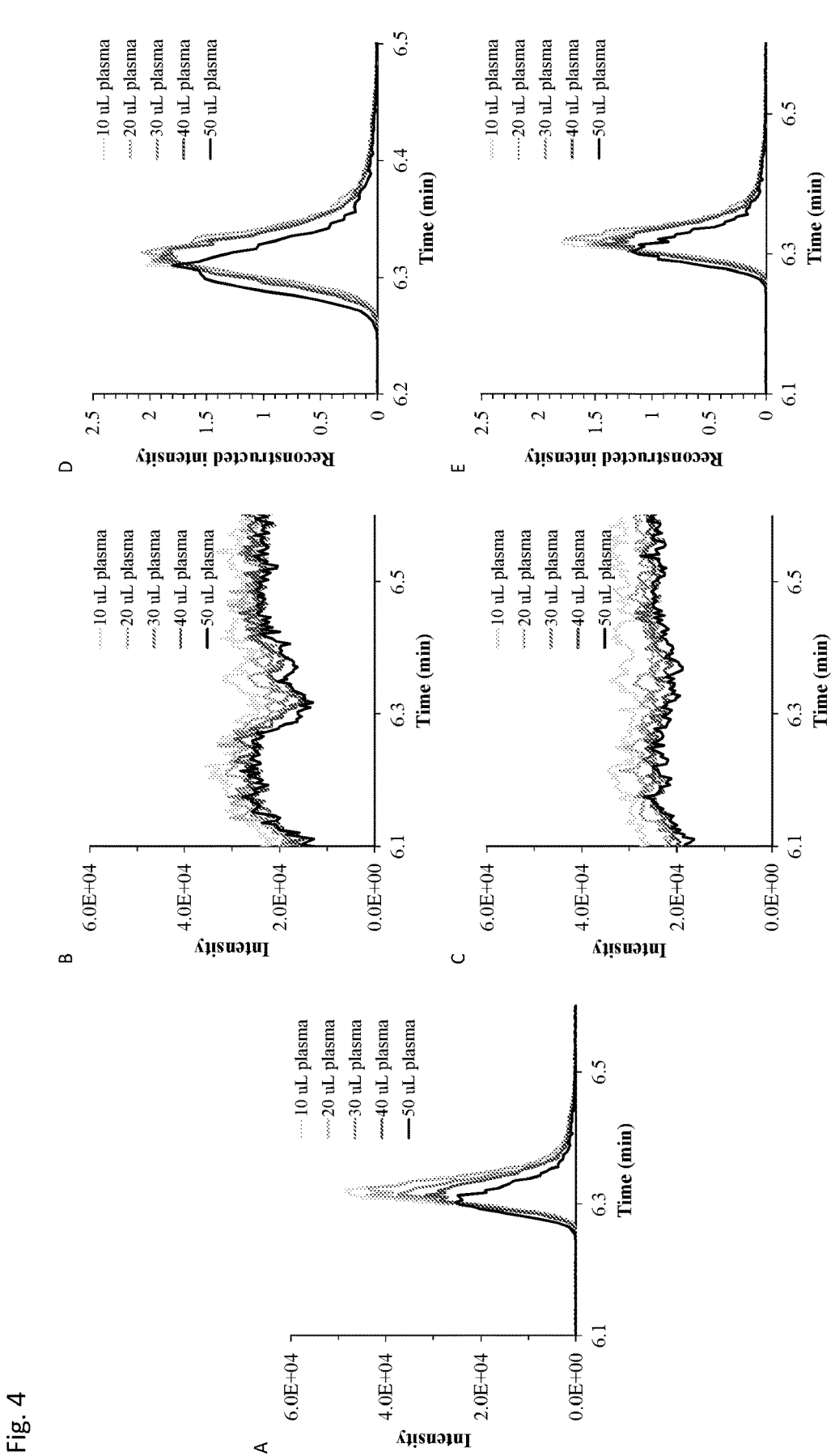
FIG. 4: The principle of matrix effect correction using a post-column infused internal standard. Extracted ion chromatogram of oleic acid-d17 in samples, wherein matrix effect is induced by altering the sample matrix (plasma) concentration (A). Extracted ion chromatograms of PCI-ISs FA(16:0)-d31 (B) and LPC(19:0) (C). Reconstructed ion chromatograms of oleic-acid-d17, obtained by scan-by-scan division of the oleic acid-d17 intensity by the intensity of PCI-IS FA(16:0)-d31 (D) and LPC(19:0) (E).

FIG. 4 shows the principle of matrix effect correction using a post-column infused internal standard.

FIG. 4 shows the principle of inducing matrix effect on an analyte in a sample by varying the concentration of the sample matrix in the injection solution (claim 2d) (panes A, B and C) and the correcting effect of two post-column infused internal standards (panes D and E).

Herein, the extracted ion chromatogram of oleic acid-d17 in samples is shown, wherein matrix effect is induced by altering the sample matrix (plasma) concentration (A). Extracted ion chromatograms of PCI-ISs FA(16:0)-d31 (B) and LPC(19:0) (C). Reconstructed ion chromatograms of oleic-acid-d17, obtained by scan-by-scan division of the oleic acid-d17 intensity by the intensity of PCI-IS FA(16:0)-d31 (D) and LPC(19:0) (E).

While the coefficient of variation (CV) of the uncorrected peak areas in pane A is 21%, the CVs of those in pane D and E are 4.6% and 9.9% respectively. Also visual evaluation shows that correction of the signal of oleic acid-d17 with FA(16:0)-d31 is more appropriate than no correction or correction with LPC(19:0).

This examples shows that Oleic acid-d17 measurements could be corrected easily with FA(16:0)-d31 as PCHS, resulting in more precise results than without correction or correction with LPC(19:0) as PCI-IS.

Example 2

This example shows the application of the invention for targeted and untargeted analysis, quantifying an analyte in samples using liquid chromatography coupled to mass spectrometry (LC-MS).

Background: nontargeted analysis is performed on (micro-)biological samples that can be divided into four groups with different biological sources, so with four different sample matrices. The aim was to detect and quantify features and to be able to compare the quantitative results over and between all batches and all matrices.

Methods: In order to detect features and determine the PCI-IS that best matches the analyte's response to matrix effect, sample pools were created to reflect the complete set of samples. Hereto, individual samples were prepared, dried, reconstituted in a solution containing an internal standard (0.25 μg/mL of daidzein-d6) and pooled. They were analyzed using an LC-MS method with a PCI-IS solution (containing 63.5 ng/mL of daidzein, 141.5 ng/mL of hydrocortisone, 240.5 ng/mL of leucine-enkephalin, 38.2 ng/mL of cimetidine and 1428.5 ng/mL of bradykinine in acetonitrile/water, 50/50, v/v) infused at a flow rate of 20 μL/min after the LC separation prior to the ionization. The analysis of the samples was repeated while adding the same PCI-IS solution, but with matrix B (100 μM of potassium acetate, 1 μM of dodecyltrimethylammonium and 30 μM of L-homoarginine) included to induce matrix effect.

The PCI-IS that best corrected the induced matrix effect on an analyte was paired with that analyte and stored in a library.

The library was subsequently applied in the analysis of 14 batches of 46-66 study samples, covering 4 different biological matrices. In addition, quality control samples (pooled samples representing all study samples, including all matrices) were analyzed in triplicate in each batch.

The method comprises the three components described herein below and uses the subject procedure to induce matrix effect. It shows the value of using of post-column infused internal standards (PCI-ISs) for correction of matrix effect, but also of general instrument response in the long term, by decreasing variation of analytical results between batches.

Results: Non-targeted analysis

Peak detection and matching was performed, first between the same sample analyzed with and without matrix B for each sample and then between different samples. As this example is intended to explain the principle of the invention, the focus will be on one (representative) feature that was detected in one of the samples. This feature was numbered 786. FIG. 5A shows the extracted ion chromatograms of it and of the five PCI-ISs in both the regular analysis run and the run with induced matrix effect (due to post-column addition of the matrix). FIG. 5B shows the feature 786 peak, reconstructed (scan-by-scan divided) by each PCI-IS. FIG. 5C shows in the left pane the EICs of the internal standard (daidzein-d6) and its non-labeled isotope PCI-IS daidzein and in the right pane the PCI-daidzein corrected internal standard peak in both the regular analysis run and the analysis run with induced matrix effect. The benefit of correction of the internal standard with PCI-IS is clearly obvious. The internal standard daidzein-d6 that was added to the samples before analysis was used to correct for possible variation in injection volume or during sample preparation. To select the optimal PCI-IS for feature 786, first, the PCI-IS corrected peak areas of the internal standard daidzein-d6 (FIG. 5C, right pane) were determined with and without induced matrix effect (tabulated in Table 1). Then, each PCI-IS reconstructed peak area of feature 786 in FIG. 5B was calculated (tabulated in Table 1), without any correction for the internal standard. At this point, the PCI-IS hydrocortisone would seem the best correcting PCI-IS with a difference of −4.7% between the sample with and without induced matrix effect. However, in order to compensate for variation in injection volume, the PCI-IS reconstructed peak areas of feature 786 were corrected (meaning divided) by the PCI-IS corrected peak area of the internal standard, giving the PCI-IS and internal standard corrected peak areas. Then again, the corrected peak area in the run with induced matrix effect was compared to that in the regular analysis run. Now, leucin-enkephalin, the PCI-IS giving the smallest difference (−1.9%), was the best of the five PCI-ISs in correcting for the induced matrix effect and therefore stored in a library to correct for feature 786 in future sample analyses.

Figure 3:
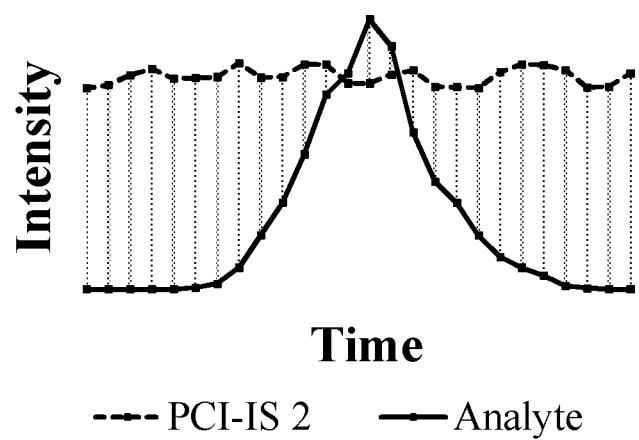
FIG. 3 is a schematic representation of the scan-by-scan correction of the analyte signal by the PCI-IS signal.
Figure 3:
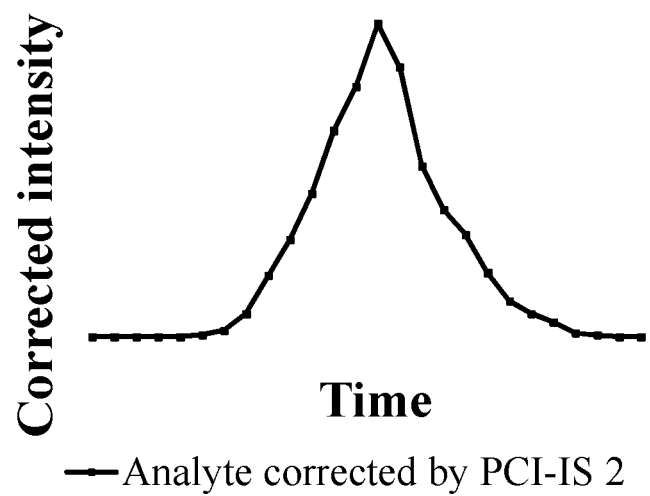
Figure 5:
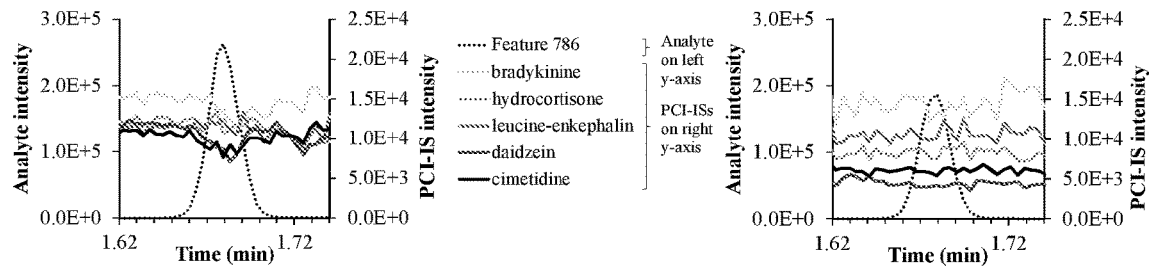
FIG. 5 discloses the induction of the matrix effect on analytes in a sample by adding a matrix (matrix B) post-column, namely the extracted ion chromatograms of a sample and of the five PCI-ISs in both the regular analysis run and the run with induced matrix effect (due to post-column addition of the matrix).
Figure 5:
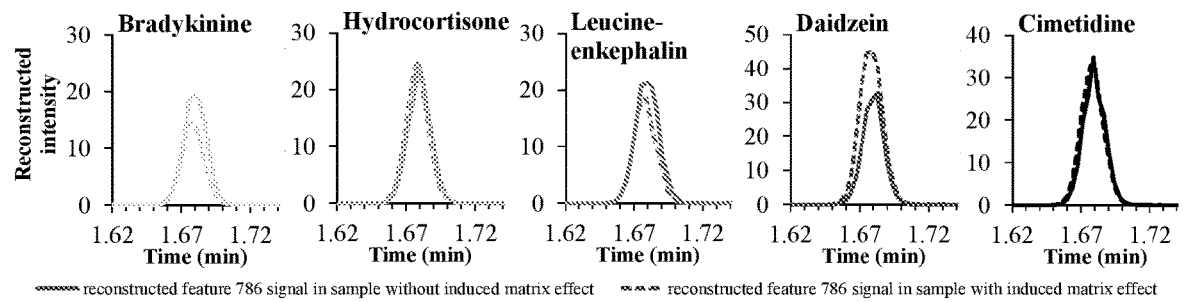
Figure 5:
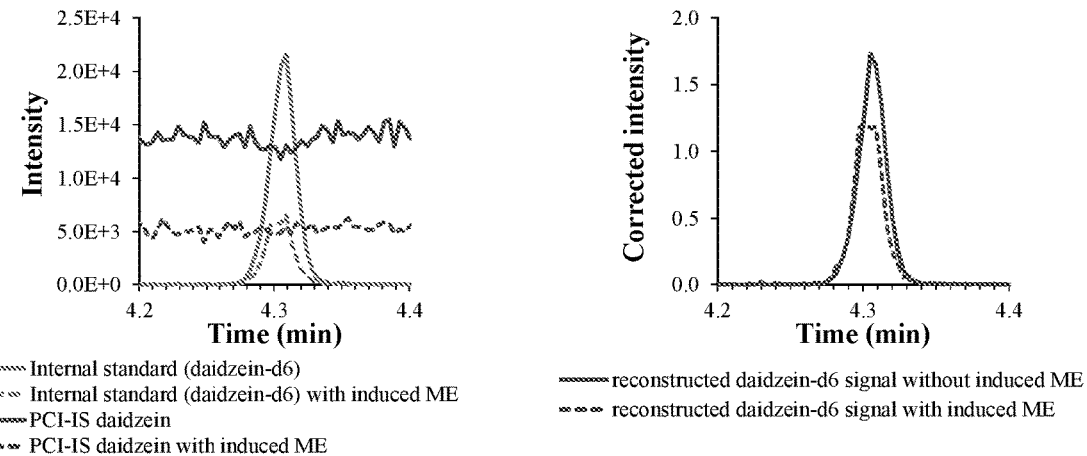
Figure 6:
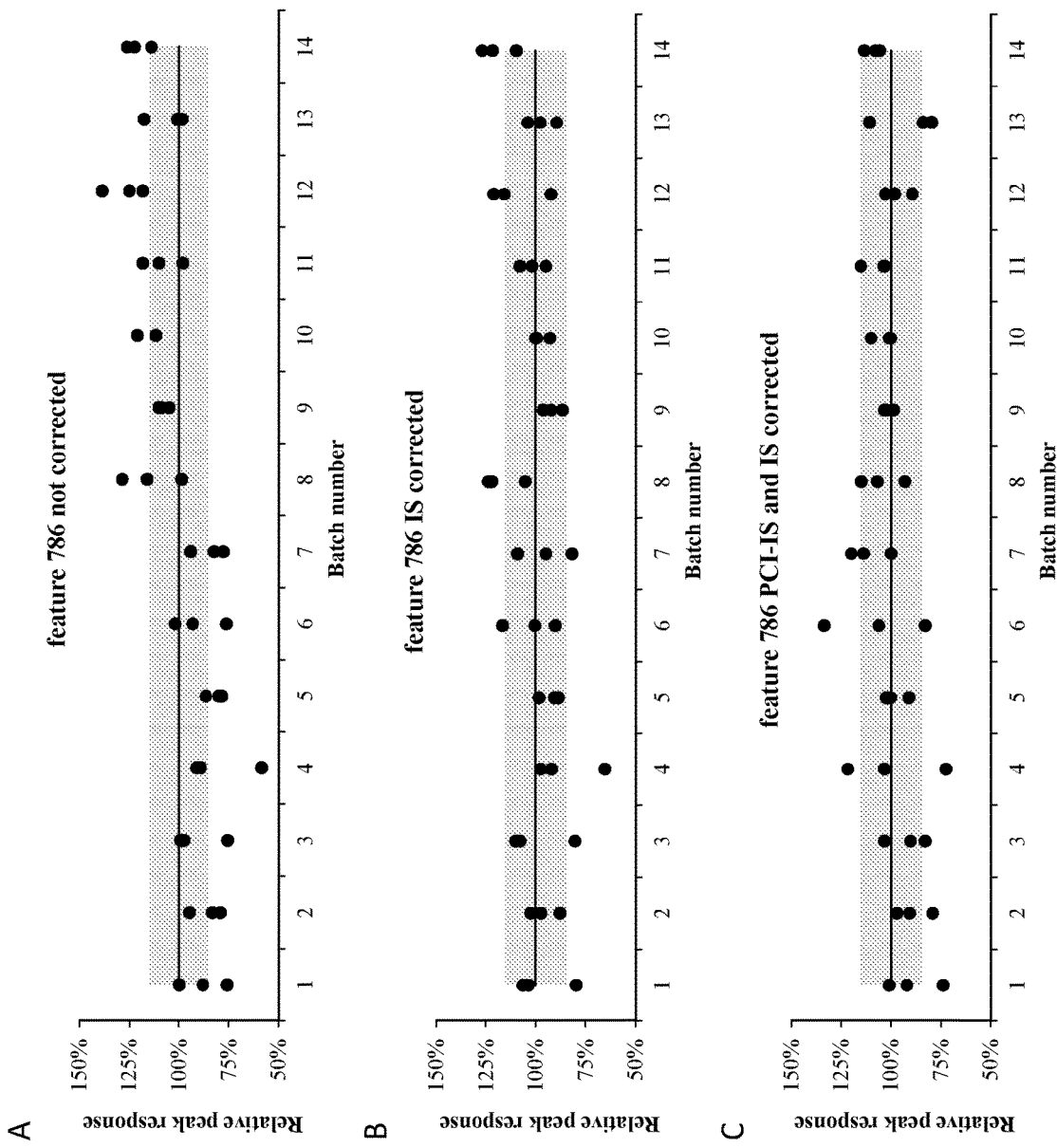
FIG. 6 shows average peak areas of feature 786 in each batch without any correction (FIG. 6A), with correction by internal standard only (FIG. 6B) and with correction by PCI-IS leucine-enkephalin and the internal standard (FIG. 6C).

The value of the PCI-IS starts to become clear when applying it in these subsequent sample analyses of the study, wherein the actual samples were being measured. Feature 786 was detected in the quality control (QC) samples, which were measured in triplicate in each of 14 batches. FIG. 6 shows average peak areas of feature 786 in each batch without any correction (FIG. 6A), with correction by internal standard only (FIG. 6B) and with correction by PCI-IS leucine-enkephalin and the internal standard (FIG. 6C). It shows how the PCI-IS and internal standard correction method was able to decrease the variation (% CV) between batches from 16% to 8%, and above that, how it could correct for the trend observed in the non-corrected peaks which gave a relative low area in batch 1-7 and a high area in batch 8-14. On the other hand, the plot in FIG. 3B shows that a similar result, also with a % CV between batches of 8%, could be obtained when using the internal standard only. This raises the question whether using an internal standard only would not be sufficient. This may indeed be sufficient in a case like this, wherein one QC-sample is measured over many batches, wherein the matrix of the sample is identical, because it is the same sample. The true value of using PCI-IS correction is its ability to correct for matrix effect, which can only be demonstrated when comparing different samples, like in the targeted analysis example described in the next section. FIG. 5 shows the induced matrix effect on analytes in a sample by adding a matrix (matrix B) post-column.

FIG. 5A) shows an extracted ion chromatograms of feature 786 and the 5 PCI-IS standards in the sample that was analysed without (continuous line) and with induced matrix effect (broken line) by a post-column infused matrix B. B) The reconstructed peaks of feature 786 after correction by each of the PCI-ISs, both in the sample that was analysed without (continuous line) and with induced matrix effect (broken line) by a post-column infused matrix B. C) The extracted ion chromatograms of the spiked internal standard (daidzein-d6) and the non-isotipically labeled PCI-IS daidzein in the left pane and in the right pane the corrected peaks, both in the sample that was analysed without (continuous line) and with induced matrix effect (broken line) by a post-column infused matrix B.

Table 1 shows the selection of the PCI-IS that best matches the analyte response to the induced matrix effect. Peak responses are calculated by summation of the corrected intensities between 10% of the highest corrected signal of the peak and substracting the difference between the first and the last of those intensities, to substract the (potential) baseline.

FIG. 6 shows the application of the selected PCI-IS to an analyte measured in QC samples over different batches. Peak response of feature 786 in each QC sample relative to the average peak response over all QC samples in 14 batches, whereby FIG. 6 A) shows the response without any correction, and 6B) shows the response with internal standard correction only, and 6C) with PCI-IS and internal standard correction. The shaded area indicates the area within 15% of the optimal value of 100%.

Example 3

Targeted analysis

A known analyte, diclofenac, was added at the same concentration to all study samples prior to analysis as part of the quality control measures. The optimal PCI-IS for diclofenac was selected by the same procedure as described earlier in this example for non-targeted analysis and was also found to be leucine-enkephalin. The peak area of diclofenac in each study sample (46-66 study samples per batch) was divided by the overall average peak area of diclofenac in an academic solution at the same concentration as the samples (measured in duplicate before and after each study batch) to obtain the relative peak area. This was done without any correction (FIG. 7A), with IS correction only (FIG. 7B) and with both PCI-IS and IS correction (FIG. 7C).

Calculated over the 14 batches, the mean relative peak response±standard deviation was 112%±15 without any correction, 110%±7.3% with IS correction only and 106%±3.0% with both PCI-IS and IS correction. The plots in FIG. 7 indeed show that the correction with PCI-IS and internal standard minimizes variation between batches with samples of similar and/or different sample matrices and bring the peak response closer to the peak response in the academic sample. The 6% difference between the PCI-IS and IS corrected peak response in the study samples and the academic samples might be explained by the potential adsorption of diclofenac to e.g. vials during sample preparation to sites that may be occupied in presence of sample matrix. Although the between-batch variation is lowered using PCI-IS and IS correction, the within-batch variation is increased because of the additional source of error that is introduced. It is expected that this can be further optimized by e.g. decreasing the non-matrix effect related variation in PCI-IS signal (for example by stabilizing the PCI-IS flow, optimizing the mixing with the eluent and/or applying a smoothing or averaging algorithm on the signal). In addition, more than one internal standard can be used. In this example, addition of an extra internal standard might have reduced the variability in batch 6 which was mainly caused by variability in internal standard response not related to matrix effect.

This example demonstrates that PCI-IS correction according to the subject invention makes it possible to quantify and compare analytes in samples from different matrices over different analysis batches, without the need of stable isotope labeled internal standards for each analyte. Taking this one step further, correction with PCI-IS and internal standard allows to enable absolute quantification of analytes in various matrices using a single calibration curve, prepared in only one matrix, that may even be academic, provided that sample matrix effects unrelated to the ionization (such as solubility of an analyte in a matrix or adsorption to preparation vial walls) are not significant or taken into account. This would save significantly in analysis time and costs as it would make running calibration lines in each batch redundant.

Figure 7:
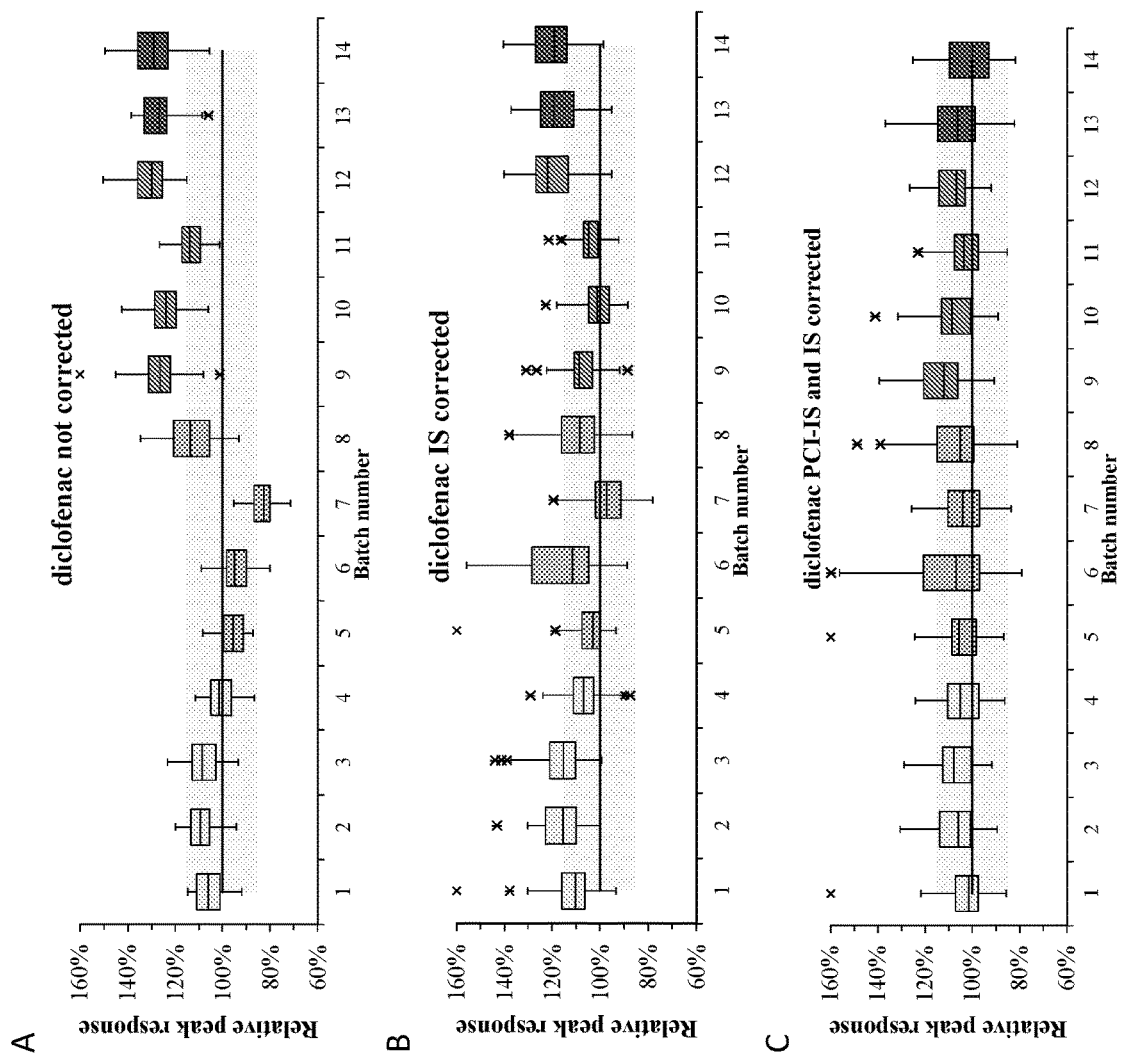
FIG. 7 shows application of the selected PCI-IS to an analyte measured in study samples over different batches and sample matrices. Boxplots of the peak response of diclofenac in each study sample relative to the average peak response of the same concentration of diclofenac in an academic solution. Boxplots with the same colour have the same general sample matrix.

FIG. 7 shows application of the selected PCI-IS to an analyte measured in study samples over different batches and sample matrices. Boxplots of the peak response of diclofenac in each study sample relative to the average peak response of the same concentration of diclofenac in an academic solution. Boxplots with the same color have the same general sample matrix. FIG. 7A) shows without any correction, FIG. 7B) with internal standard correction only and FIG. 7C) with PCI-IS and internal standard correction. The grey shaded area represents the area within 15% of the optimal value of 100%. The + sign in FIG. 7 indicates an outlier with a value above 160%. In batch 9 of plot A: 163%; in batch 1 and 5 of plot B: 196% and 667% respectively (these are caused by incorrect determination of the internal standard peak area); in batch 1 and 5 of plot C: 187% and 727% respectively (these are caused by incorrect determination of the internal standard peak area). The * sign indicates an outlier with a value over 1.5× the inter quarttile range, but below 160%.

The above experiments show the effectivity of the subject method for allowing to correct matrix effects.

The invention claimed is:

1. A method for quantifying one or more analytes in a sample forming a sample matrix, by an analysis system comprising a separation unit, a means of adding a solution of post-column infused internal standards (PCI-ISs) post-column to an eluate, and a detection unit comprising a mass spectrometer coupled through an ionization source, the method comprising:
   a. inducing a matrix effect on the one or more analytes in the sample and on the post-column infused internal standards (PCI-ISs) by one of the following steps:
      i. adding one or more test matrices (matrices B) to the eluate, after separation in the separation unit and before introduction to the ionization source of the mass spectrometer (herein referred to as post-column); or
      ii. varying the composition of the sample matrix (matrix A) by mixing it with other test matrices (matrices C); or
      iii. varying the concentration of the sample matrix (matrix A); and
   b. matching one or more post-column infused internal standard(s) (PCI-IS) to each analyte that best matches the analyte's response to the matrix effect to obtain an analyte-matched PCI-IS identification and associated response data, and
   c. storing the analyte-matched PCI-IS identification and associated response data in a library; and
   d. applying the analyte-matched PCI-IS to the one or more analytes in other samples to correct observed analyte peak responses for the matrix effect during ionization.

2. The method according to claim 1, wherein during step d the analyte-matched PCI-IS is additionally applied to obtain absolute quantitation of the analyte using the response data, wherein the one or more analytes may not have a structure assigned yet, or a compound with a known structure for which no reference material is available, or a compound for which the use of reference material is not practical due to costs or instability, or a compound with a known structure for which a reference material is available.

3. The method according to claim 1, wherein the separation unit is configured and operable to produce a liquid flow, selected from the group consisting of a liquid chromatography unit, a supercritical fluid chromatography and an online solid phase extraction unit, wherein the ionization source is an electrospray ionization source.

4. The method according to claim 1, wherein in step (a)(i) the one or more matrices comprises at least one compound, or plurality of compounds expected to induce a matrix effect on the analytes in the sample, wherein in step (a)(i), one or more salts and/or ionic compounds able to form adducts, a compound with surface activity and/or a compound with high proton affinity, and/or a biologically originating matrix, a fraction thereof, are employed.

5. The method according to claim 1 for determining for each analyte the PCI-IS that best matches the analyte's response to matrix effect, further comprising:
(a) determining for each analyte in the sample a signal, reconstructed by each PCI-IS, with, and separately, without inducing the matrix effect according to step (a); and
(b) assessing, which of the compounds employed as PCI-IS, or combination of compounds, matches best the analyte's response to the induced matrix effect.

6. The method according to claim 5 for determining for each analyte a reconstituted signal for each PCI-IS and internal standard reconstructed signal, both with and without inducing the matrix effect, further comprising one or more of
a. subjecting the one or more analytes of the sample to the analysis system, while adding post-column a solution of one or more PCI-IS(s) to the eluate;
b. repeating the subjection of the one or more analytes of the sample to the analysis system while inducing the matrix effect by applying one or more of the procedures specified in step (a) of claim 1;
c. dividing in each sample the signal or intensity of a scan-by-scan by the PCI-IS signal or intensity in the same analysis run, giving a PCI-IS-reconstructed analyte signal or peak response;
d. dividing the signal or intensity of each internal standard scan-by-scan by the signal or intensity of its matched PCI-IS in the same measurement run, giving the PCI-IS-corrected internal standard signal or peak response; and
e. dividing the PCI-IS-reconstructed analyte signal or peak response by the applicable PCI-IS-corrected internal standard signal(s) or peak response(s) in the same measurement run, giving a PCI-IS and internal standard reconstructed peak response.

7. The method according to claim 6, wherein the method comprises an additional step of adding one or more internal standards to the sample prior to analysis in step b, wherein the one or more internal standards added to the sample during sample preparation comprise a structural analogue of PCI-IS and/or a stable isotope labelled version of a PCI-IS.

8. The method according to claim 7, wherein an assessment for each analyte which PCI-IS matches best the analyte's response to the induced matrix effect comprises basing the selection of PCI-IS on:
(a) values for accuracy, comparing the PCI-IS and internal standard reconstructed peak response of each analyte in a sample with, and without the induced matrix effect as specified in claim 1;
(b) values for precision of the PCI-IS reconstructed peak response of the analyte across matrices and/or samples; or
(c) its ability to increase a linear dynamic range of an analyte and/or on values for accuracy and/or on values for precision.

9. The method according to claim 1, wherein a variety of test matrices is used to induce a matrix effect on the one or more analytes in a sample, wherein the induced effect of the individual test matrices on the analyte is employed for:
a. at least partial structural identification of the analyte; and/or
b. optimization of the selection of PCI-IS or a combination of PCI-ISs that best matches the analyte's response to induced matrix effects.

10. The method according to claim 1, wherein the one or more PCI-IS, or combination of PCI-ISs that matches best the one or more analyte's response to the induced matrix effect(s) is stored in a library unit, wherein the analyte-matched PCI-IS or combination of PCI-ISs in the library is applied to the one or more analytes, comprising the steps of:
a. subjecting the one or more analytes of the sample to the analysis system;
b. adding a post-column a solution of PCI-IS(s) to the eluate;
c. matching the analyte signals found in the sample with analytes stored in the library unit; and
d. reconstructing the mass spectrometric response of each analyte in the sample by dividing the signal or intensity of each internal standard scan-by-scan by the signal or intensity of its matched PCI-IS in the same measurement run, giving a PCI-IS-corrected internal standard signal or a peak response and dividing a PCI-IS-reconstructed analyte signal or peak response by the applicable PCI-IS-corrected internal standard signal(s) or peak response(s) in the same measurement run, using the matched PCI-IS in the library unit, to obtain a final PCI-IS and internal standard corrected peak response.

11. The method according to claim 1, wherein the PCI-IS signal or a signal ratio between each analyte and PCI—IS is being used for quality control purposes.

12. A test matrix composition or combination of matrix compositions for determination of the structure and/or quantity of one or more analytes in a sample according to claim 1, wherein the composition comprises one or more salts and/or ionic compounds able to form adducts, a compound with surface activity and/or a compound with proton affinity, and/or a biologically originating matrix, a fraction thereof in a predetermined concentration and a suitable solvent or eluent.

13. A system configured for determination of the structure and/or quantity of one or more analytes in a sample, comprising:
a. an analysis system comprising a sample separation unit and a detection unit comprising a mass spectrometer coupled through an ionization source;
b. unit configured for inducing a matrix effect on the analytes in the sample;
c. a unit configured for matching one or more post-column infused internal standard(s) (PCI-IS) to each analyte that best matches the analyte's response to the matrix effect;
d. a library unit for storing the analyte-matched PCI-IS identification and associated response data in a library; and
e. a processing unit configured for applying the analyte-matched PCI-IS identification and associated response data to the analyte in another sample to correct the analyte peak responses for the matrix effect during ionization, to obtain concentration data of the analytes.

14. A kit for use in a system for determining and correcting sample matrix effects on the detection of one or more analytes in a sample, comprising one or more matrix compositions comprising one or more salts and/or ionic compounds able to form adducts, a compound with surface activity and/or a compound with proton affinity, and/or a biologically originating matrix, a fraction thereof, in a predetermined concentration and a suitable solvent or eluent.

15. A method for quantifying one or more analytes, wherein the one or more analytes may be a compound for which no structure has been assigned yet or a compound with a known structure for which no reference material is available, or a compound for which the use of reference material is not practical due to availability or instability, in a sample by an analysis system comprising a separation unit, a means of adding a solution post-column, and a detection unit comprising a mass spectrometer coupled through an ionization source, the method comprising:
  a. inducing a matrix effect on the one or more analytes in the sample and on the post-column infused internal standards (PCI-ISs);
  b. matching one or more post-column infused internal standard(s) (PCI-IS) to each analyte that best matches the analyte's response to the matrix effect to obtain analyte-matched PCI-IS identification and associated response data, and
  c. storing the analyte-matched PCI-IS identification and associated response data in a library; and
  d. applying the analyte-matched PCI-IS to the one or more analytes in other samples to correct analyte peak responses for the matrix effect during ionization and, to obtain absolute quantitation of the one or more analytes using the response data, wherein the separation unit is configured and operable to produce a liquid flow selected from the group consisting of a liquid chromatography unit, a supercritical fluid chromatography unit and an online solid phase extraction unit, wherein an ionization source is an electrospray ionization source.

16. The method according to claim 15, wherein the induction of the matrix effect in step (a), comprises one of the following steps:
  a. adding one or more test matrices (matrices B) to an eluate obtained after the separation and before introduction to the ionization source of the mass spectrometer (herein referred to as post-column);
  b. varying the composition of a sample matrix (matrix A) by mixing it with other test matrices (matrices C); and
  c. varying the concentration of the sample matrix (matrix A),
    wherein in step (a) the one or more matrices comprises at least one compound, or a plurality of compounds expected to induce a matrix effect on the one or more analytes in the sample, wherein one or more salts and/or ionic compounds able to form adducts, a compound with surface activity and/or a compound with proton affinity, and/or a biologically originating matrix, a fraction thereof, are employed, wherein in (b) the test matrix comprises a solvent or combination of solvents that do not induce the matrix effect on the one or more analytes, a biologically originating matrix, a fraction thereof and/or a single or plurality (of) compound(s) expected to induce a matrix effect on the analytes in the sample.

17. The method according to claim 15 for determining for each analyte the PCI-IS that best matches the one or more analyte's response to matrix effect, comprising:
  (a) determining for each analyte in the sample a signal, reconstructed by each PCI-IS, and an internal standard added prior to or during sample preparation, with inducing matrix effect according to claim 1, step (a); and separately without inducing matrix effect according to claim 1, step (a); and
  (b) assessing, which of the PCI-IS compounds, or combination of compounds, matches best the analyte's response to the induced matrix effect.

18. The method according to claim 17 for determining for each analyte each PCI-IS and internal standard reconstructed signal, both with and without inducing the matrix effect, comprising one or more of:
  a. adding one or more internal standards to the sample prior to analysis;
  b. subjecting the one or more analytes of the sample to the analysis system, while adding a post-column a solution of one or more PCI-IS(s) to the eluate;
  c. repeating the subjection of the one or more analytes of the sample to the analysis system while inducing the matrix effect;
  d. dividing in each sample the signal or intensity of the analyte scan-by-scan by the PCI-IS signal or intensity in the same analysis run, giving a PCI-IS-reconstructed analyte signal or peak response;
  e. dividing the signal or intensity of each internal standard scan-by-scan by the signal or intensity of its matched PCI-IS in the same measurement run, giving the PCI-IS-corrected internal standard signal or peak response; and
  f. dividing the PCI-IS-reconstructed analyte signal or peak response by the applicable PCI-IS-corrected internal standard signal(s) or peak response(s) in the same measurement run, providing the PCI-IS and internal standard reconstructed peak response, wherein the internal standards added to the sample during sample preparation comprise a structural analogue of a PCI-IS and/or a stable isotope labelled version of a PCI-IS, wherein a smoothing or averaging algorithm on the signal is applied in steps d) and/or (e) and/or (f), wherein the assessment for each analyte which PCI-IS matches best the analyte's response to the induced matrix effect comprises basing the selection of PCI-IS on values for accuracy, comparing the PCI-IS and internal standard reconstructed peak response of the analyte in a sample with, and without induced matrix effect as specified in step (a) of claim 1.

19. The method according to claim 15, wherein a variety of test matrices is used to induce a matrix effect on the one or more analytes in a sample, wherein the induced effect of individual test matrices on the analyte is employed for:
  a. at least partial structural identification of the one or more analytes; and/or
  b. optimization of the selection of PCI-IS or a combination of PCI-ISs that best matches the analyte's response to induced matrix effects, wherein the one or more PCI-IS, or combination of PCI-ISs that matches best the analyte's response to the induced matrix effect(s) is stored in the library unit.

20. The method according to claim 19, wherein the analyte-matched PCI-IS or combination of PCI-ISs in the library is applied to the analytes, comprising the steps of:
  a. adding one or more internal standards to the sample prior to analysis;
  b. subjecting the one or more analytes of the sample to the analysis system;
  c. adding post-column a solution of PCI-IS(s) to an eluate obtained post-column;
  d. matching the analyte signals found in the sample with analytes stored in the library unit; and
    reconstructing a mass spectrometric response of each analyte in the sample by dividing the signal or intensity of each internal standard scan-by-scan by the signal or intensity of its matched PCI-IS in the same measurement run, giving a PCI-IS-corrected internal standard signal or peak response and dividing the PCI-IS-reconstructed analyte signal or peak response by an applicable PCI-IS-corrected internal standard signal(s) or peak response(s) in the same measurement run, providing a PCI-IS and internal standard reconstructed peak response, using the matched PCI-IS in a library unit, to obtain a final PCI-IS and internal standard corrected peak response, wherein retrospective data processing is applied to correct analytes for matrix effect using a PCI-IS found to be suitable to correct for this analyte in a later experiment, wherein retrospective data processing is applied to absolutely quantify measured analytes for which a reference standard has become available using a PCI-IS correction based on a PCI-IS found to be suitable for correcting the matrix effect and a reference measurement or a calibration series of the analyte that has been measured with the PCI-IS at least once, wherein the PCI-IS signal or a signal ratio between analyte and PCI-IS is being used for quality control purposes.

* * * * *